US010900466B2

(12) United States Patent
Giertz (10) Patent No.: US 10,900,466 B2
(45) Date of Patent: Jan. 26, 2021

(54) METHOD FOR SENDING A CONTROLLER SETPOINT FOR A POWER GENERATOR, DEVICE THEREFOR AND SYSTEM CONTAINING THE SAME

(71) Applicant: Wobben Properties GmbH, Aurich (DE)

(72) Inventor: Helge Giertz, Leer (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/321,349

(22) PCT Filed: Jul. 24, 2017

(86) PCT No.: PCT/EP2017/068643
§ 371 (c)(1),
(2) Date: Jan. 28, 2019

(87) PCT Pub. No.: WO2018/024530
PCT Pub. Date: Feb. 8, 2018

(65) Prior Publication Data
US 2019/0178229 A1    Jun. 13, 2019

(30) Foreign Application Priority Data

Aug. 2, 2016    (DE) .................. 10 2016 114 254

(51) Int. Cl.
*F03D 7/00*    (2006.01)
*F03D 7/04*    (2006.01)
(Continued)

(52) U.S. Cl.
CPC .......... *F03D 7/048* (2013.01); *F03D 7/0284* (2013.01); *F03D 7/047* (2013.01); *H02J 3/386* (2013.01);
(Continued)

(58) Field of Classification Search
None
See application file for complete search history.

(56) References Cited

U.S. PATENT DOCUMENTS 7,756,609 B2    7/2010    Jurkat et al.
9,104,187 B2    8/2015    Bluhm et al.
(Continued)

FOREIGN PATENT DOCUMENTS

CN    101392724 A    3/2009
CN    101868766 A    10/2009
(Continued)

OTHER PUBLICATIONS

Li et al., "Novel AGC Strategy Considering Communication Failure Possibility for Interconnected Power Grids," *Preprints of the 5th International Conference on Electric Utility Deregulation and Restructuring and Power Technologies*, Changsha, China, Nov. 26-29, 2015, pp. 2528-2531.

*Primary Examiner* — Paul B Yanchus, III
(74) *Attorney, Agent, or Firm* — Seed IP Law Group LLP (57) ABSTRACT

Provided is a method, device and system for outputting a controller setpoint for at least one power generator that is at least one wind power installation, at least one windfarm, or a cluster controller. The method includes receiving, over a data input, a data packet including a current setpoint and a plurality of future setpoints, storing the future setpoints of the received data packet in a memory, and outputting, over a data output, the current setpoint as the controller setpoint. If after the expiration of a predefined time period from the reception of the data packet, no further data packet is received, a first setpoint of the stored plurality of future setpoints is output over the data output as a next controller setpoint.

16 Claims, 4 Drawing Sheets

(51) Int. Cl.
  *F03D 7/02* (2006.01)
  *H02J 3/38* (2006.01)
  *H02J 13/00* (2006.01)

(52) U.S. Cl.
  CPC ...... *H02J 13/0062* (2013.01); *H02J 13/0086* (2013.01); *Y02E 10/72* (2013.01); *Y02E 10/76* (2013.01); *Y02E 40/70* (2013.01); *Y02E 60/00* (2013.01); *Y04S 10/123* (2013.01); *Y04S 40/124* (2013.01)

(56) References Cited

U.S. PATENT DOCUMENTS

| | | |
|---|---|---|
| 9,279,411 B2 | 3/2016 | Beekmann et al. |
| 10,050,447 B2 | 8/2018 | Burra et al. |
| 2013/0185437 A1 | 7/2013 | Willig et al. |
| 2013/0325997 A1* | 12/2013 | Higgins ............ H04L 41/0893 709/208 |
| 2014/0039811 A1 | 2/2014 | Bohlen et al. |
| 2014/0049109 A1 | 2/2014 | Kearns et al. |
| 2015/0142187 A1 | 5/2015 | Yamane et al. |
| 2016/0320084 A1* | 11/2016 | Hashimoto ............ F24F 11/62 |
| 2017/0363065 A1 | 12/2017 | Jakobs et al. |

FOREIGN PATENT DOCUMENTS

| | | |
|---|---|---|
| CN | 105264222 A | 1/2016 |
| DE | 102010006527 A1 | 8/2011 |
| DE | 102015200209 A1 | 7/2016 |
| EP | 1783365 A2 | 5/2007 |
| RU | 2516381 C2 | 5/2014 |
| RU | 2543367 C1 | 2/2015 |
| WO | 2014173685 A1 | 10/2014 |

* cited by examiner

METHOD FOR SENDING A CONTROLLER SETPOINT FOR A POWER GENERATOR, DEVICE THEREFOR AND SYSTEM CONTAINING THE SAME

BACKGROUND

Technical Field

The invention relates to the output of controller setpoints for regulating power generators, such as, for example, wind power installations, in particular for regulating the feed of electric power from the power generators into a supply network.

Description of the Related Art

Along with conventional large power stations which, for example, produce electric power by means of fossil fuels and serve to secure the base load, more and more wind power installations are connected nowadays to a supply network in order to jointly feed power into the supply network. Wind power installations, along with gas-powered, hydroelectric and solar power stations frequently serve to provide the average and peak loads in the supply network.

The reason for this is that, compared with conventional power stations, wind power installations offer the advantage that the electric power that is fed in can be adjusted in a particularly flexible manner within very short time periods with regard to its parameters, such as, for example, active or reactive power, according to the requirement of the consumers connected to the supply network. In contrast, the procedure for increasing or reducing power to be fed in by conventional large power stations is very slow, so that an adjustment, i.e., an increase or reduction, can take hours.

However, since the energy requirement of the consumers connected to the supply network varies greatly depending on the time of day or the day of the week, a high flexibility is required with respect to the electric power available in the supply network. Forecasting mechanisms are known, for example, for providing a required varying power to satisfy the base load depending on the time of day in order to thus intervene at an early time in the regulation of conventional large power stations. These large power stations therefore set the amount of their energy feed according to a forecast weekly or daily schedule and thus serve to provide the base load of the supply network. However, in the case of additional short-term energy requirement variations, in the case of varying average and peak loads, wind power installations are more and more frequently used for network support in order to guarantee a high flexibility and therefore a high network security here.

The transmission system operator (TSO) and/or the supply network operator, which are considered jointly here and are generally referred to below as the network operator, thus transmits current setpoints from its control center, for example to regulate the power to be fed in from a windfarm, on the basis of the currently required power as controller setpoints to the controllers of a windfarm or individual wind power installations. A data communication line is used to transmit the current setpoints. It is possible here for a cluster controller (CLU), also known as a virtual power plant (VPP), also to be connected between the transmission system operator and a windfarm or individual wind power installations. A cluster controller transmits the current setpoints specified by the network operator, if necessary after adjustment in the cluster controller, as individual current setpoints for a plurality of power generators, for example windfarms, of a subnetwork of the supply network. The subnetwork of the supply network is also referred to as a cluster. These current setpoints are therefore received by wind power installations or windfarms, for example, at minute intervals.

It is known here that communication faults can occur between the control center of the network operator and the windfarm or the wind power installations. In the case where, for example, current setpoints are no longer transmitted, an autonomous operation of the wind power installation or the windfarm must therefore also be guaranteed in some way. A plurality of possibilities are known here in the prior art for dealing with communication failures of this type.

Today, it is provided, for example, that a wind power installation or windfarm which receives no current setpoints from a control center or cluster controller to control, for example, the power to be fed in sets the controller setpoint to a specified standard value, which can also be referred to as a default value. The same applies in the case where a cluster controller no longer receives setpoints from the control center of the network operator. The windfarm or wind power installation is operated accordingly with this standard value until the data transmission between the control center and the windfarm is restored and further current setpoints are received. In the worst case, the windfarm is removed from the network for the duration of the communication fault.

However, particularly in light of the ever-increasing influence of windfarms or other power generators on the provision of average and peak loads to support power fluctuations in the supply network, it is desirable, even in the event of a failure of the communication facilities between the control center of a network operator and the power generators, that the controller setpoints for controlling the power generator are not limited exclusively to a standard value, but a network support continues to be provided by means of a response to short-term power requirement variations. Controller setpoints for the control are therefore intended accordingly to continue to be output as far as possible according to the requirement situations, even if said setpoints can no longer be directly specified due to a communication failure.

The German Patent and Trademark Office has identified the following prior art in the priority application for the present application: DE 10 2010 006 527 A1, US 2014/0049109 A1, US 2013/0185437 A1, US 2015/0142187 A1 and Li, Z. et al. "Novel ACG strategy considering communication failure possibility for interconnected power grids".

BRIEF SUMMARY

In the case of a communication failure between a control center of a network operator and power generators, in particular wind power installations or windfarms, the controller setpoints are intended to continue to be adjusted as well as possible according to the energy requirement of the consumers connected to the network.

The invention relates to a method and a device for outputting a controller setpoint for a power generator, in particular at least one wind power installation or at least one windfarm, or a cluster controller. A data packet is received with a data input for this purpose. The data packet comprises a current setpoint and furthermore, according to the invention, a plurality of future setpoints. The data packet has preferably been previously transmitted from a control center of a network operator or a cluster controller.

With regard to the setpoints of a data packet, a distinction is made accordingly between current setpoints and future setpoints. Current setpoints are those setpoints with which the controller of a power generator, for example a wind power installation or a windfarm, or a cluster controller is to be supplied at a current time, i.e., preferably at or immediately after the time of reception of the data packet. These current setpoints correspond accordingly, for example, to the aforementioned setpoints calculated at fixed intervals, for example at minute intervals, by the transmission system operator for the current requirement situation. Conversely, future setpoints are values which correspond, for example, on the basis of forecasts of the transmission system operator, with a high probability to the setpoints in order to respond to energy requirement variations occurring in the future.

Here, setpoints are, for example, power setpoints specified for a controller or power controller of a power generator, preferably setpoints for controlling the delivery of the reactive power and/or the active power of the wind power installation or windfarm. However, setpoints are also, for example, voltage setpoints for a cluster controller which requires them for voltage stability tasks in supply networks, i.e., in order to control the power generators connected to the cluster controller in such a way that desired voltage limits are respected in the network.

The future setpoints of the received data packet are then stored, i.e., saved, in a memory.

The current setpoint of the received data packet is then output with a data output as a controller setpoint for the power generator, for example the wind power installation or windfarm, or for the cluster controller. The current setpoint of a received data packet is therefore output accordingly, preferably immediately or immediately after the reception of a data packet, as a controller setpoint for the power generator, for example the wind power installation or windfarm, or the cluster controller.

After the expiry of a predefined time period in which, after the reception of the data packet, no further, i.e., new, data packet is received, a first of the stored future setpoints is output with the data output as the next controller setpoint for the power generator or the cluster controller.

The invention relates accordingly to a device with a data input, a memory and a data output. Data packets which in each case comprise a current setpoint and a plurality of future setpoints are receivable with the data input. The memory is configured to store future setpoints of received data packets. The data output is configured to output controller setpoints for the power generators or the cluster controller.

The device is furthermore configured, after the reception of a data packet with the data output, to output the current setpoint of the received data packet as a controller setpoint and, after the expiry of a predefined time period in which, after the reception of the data packet, no further data packet is received, to output a first of the stored future setpoints with the data output as the next controller setpoint. A control unit of the device is preferably provided for this purpose. The control unit is configured accordingly to first separate the current and future setpoints of the data packet and to save the future setpoints in the memory. The current setpoint is then output immediately after the reception of the data packet at the data output as a controller setpoint.

The control unit furthermore monitors the time period which elapses after the reception of a data packet. If this time period exceeds a predefined time period and if no further data packet is received within this predefined time period, the control unit reads a future setpoint stored in the memory and outputs said future setpoint, instead of a new current setpoint of a further data packet which is in fact not available, as a controller setpoint to control the power generator of cluster controller.

Data packets comprising not only current setpoints but also future setpoints can be transmitted accordingly from the network operator or the control center of a network operator or a cluster controller to the device. This means that future setpoints that have been forecast by the network operator alone or with the assistance of a forecast service provider are already jointly transmitted as a precaution in case of a possibly imminent failure of the data connection between the network operator and the windfarm or the cluster controller and the windfarm. If the data transmission is disrupted, the forecast setpoints, which are referred to here as future setpoints, can be used alternatively instead of setpoints calculated in real time, i.e., the current setpoints referred to herein, in order to supply controllers of the power generators, for example the wind power installations or the windfarm, or the cluster controller, with a setpoint.

The invention is based here on the realization that specific forecast service providers can predefine highly accurate forecasts nowadays for the power requirement of a supply network for time periods in the future. For time periods in the near future, for example in the range from 20 minutes to one hour, short-term power requirement variations can be forecast with a probability of virtually 100% accuracy. The deviations in a forecast are limited for the following 24 hours, for example, even to a deviation of around 3% only.

The long-term forecast is already used today by conventional power stations to increase or reduce the power that can be made available in a timely manner despite their slow response, for example according to the planned requirement, thereby securing the base load.

The short-term forecast, which is substantially more accurate, can preferably be used according to the invention in order to bridge disruptions in the data transmission at least for a certain time period. There is accordingly no need to operate a power generator, such as, for example, a wind power installation or windfarm, or a cluster controller which currently receives no regularly updated setpoints from the control center of a network operator, with a single standard value.

The method is preferably used directly in a control unit of a power generator or cluster controller. The corresponding device according to the invention is, for example, a component of a windfarm controller, a control unit of a single wind power installation or a cluster controller.

According to a first embodiment, following each reception of a further data packet, i.e., a data packet which is received following a previously received data packet, the future setpoints stored in the memory are overwritten with the future setpoints of the further data packet.

Not only constantly new current setpoints but also future setpoints are determined accordingly by the network operator on the basis of forecasts. After each reception of a new or further data packet, these new future setpoints then also replace the last-saved future setpoints.

It is thereby guaranteed that forecast future setpoints which, for example, when a data packet was dispatched, were even further in the future than at a subsequent time at which a further data packet is dispatched were already forecastable with a higher reliability at the subsequent time. This means that future setpoints which were defined, for example, for a specific future time, but were already forecast some time ago, can also be replaced with new future setpoints, for example for the same times also, since the new future setpoints can be forecast with higher accuracy.

According to a further embodiment, a setpoint validity period is allocated in each case to each of the setpoints of a data packet. Each setpoint is allocated a time period for which it is intended to be valid and is output as a controller setpoint. After the expiry of this time period, the corresponding next setpoint is then output as a controller setpoint. A setpoint validity period which then corresponds to the predefined time period is therefore also stored accordingly for the current setpoint.

After the expiry of the predefined time period which corresponds here to the setpoint validity period of the current setpoint which was extracted from the last-received data packet, in which time period, after the reception of the data packet, no further data packet is received, the stored future setpoints are output successively with the data output in each case for the time period which corresponds to the respective setpoint validity period as the controller setpoint, provided that no further new data packet is received.

The setpoint validity periods are predefined accordingly by the network operator. Setpoints, for example, which are in the near future and can therefore still be defined with a very high accuracy and resolution are provided with a threshold validity period which is less than setpoints further in the future which in any case can no longer be defined relatively exactly. The setpoint validity periods are therefore defined accordingly by the network operator, preferably in the control center, and are allocated to the setpoints. The setpoint validity periods are then transmitted in a data packet together with the setpoints.

According to a further embodiment, a timestamp is allocated in each case to each of the stored future setpoints. After the expiry of the predefined time period in which, after the reception of the data packet, no further data packet is received, the stored future setpoints are then output successively with the data output in each case at the time corresponding to the timestamp as the next controller setpoint, provided that no further new data packet is received.

After a data packet is received via the data input, the predefined time period is therefore first waited. If no further, i.e., new, data packet is then received, a new controller setpoint is always output in each case at the times corresponding to the time of a timestamp of a future setpoint. Provided that no further data packet is received, the future setpoints are therefore output in the course of time in each case as controller setpoints at the times to which their timestamps are in each case allocated.

As a result, it is possible, for example, for the network operator to specify a sequence of the future setpoints by means of their timestamps or setpoint validity periods, said sequence being flexible. In particular, for example, if a network operator believes that, for example, the setpoint does not have to be changed for a considerable time period, as could be the case, for example, at night, the timestamps or setpoint validity periods can be selected for this time period with a greater time interval than would be necessary, for example, in the morning when the requirement for power which is drawn by consumers from the supply network fluctuates more widely.

In the case where, for example, twenty or fewer future setpoints are transmitted in the data packet, a longer failure of a data connection is therefore to be bridged, at least in the failure time period which is not subjected to such wide fluctuations, by selecting a longer interval of the timestamps or longer setpoint validity periods. Particularly at night when, for example, it is more difficult than during normal business hours to provide service personnel to repair damage to a data connection, it is therefore advantageous to select timestamps with a greater time interval or longer setpoint validity periods than during the day.

According to a further embodiment, the timestamps correspond to different times, wherein the time interval which is allocated to the times corresponding to the timestamps increases according to the temporal sequence of the timestamps.

Since setpoints in the immediate future can be calculated very precisely due to a near forecast time, and setpoints in the distant future can be defined relatively less precisely, it is therefore advantageous to use the more precise values for the control in the case of a failure of the data connection, also as precisely as possible, i.e., with a high "resolution", i.e., a high update rate of the controller setpoint, and to forego this high update rate as soon as the future setpoints in any case have a relatively lower reliability.

According to a further embodiment, a sequence is allocated to the stored future setpoints. Furthermore, after the expiry of the predefined time period in which, after the reception of the data packet, no further data packet is received, and after each further expiry of the predefined time period or after each expiry of a further predefined time period or after each expiry of a temporally increasing time period, one of the future setpoints is then output in each case according to its sequence. This takes place provided that no further data packet is received.

Compared with the aforementioned embodiment, this embodiment saves on the transmission of timestamps for the setpoints so that the data volume of a data packet is selectable as relatively smaller. However, it is accepted here that a specification of the time at which a setpoint is intended to be output as a controller setpoint is determined by the device on the basis of the predefined time period, a further predefined time period or a predefined temporally increasing time period and can no longer be specified individually by the transmission system operator.

According to a further embodiment, in the case where all stored future setpoints have already been output as controller setpoints and no further data packet has been received, a predefined standard value, which can also be referred to as a default value, is output as a controller setpoint. This predefined standard value is therefore output as a controller setpoint until a further data packet is received.

It is assumed that the number of future setpoints which are stored in the memory is selected in such a way that a complete time period with an average failure duration in which a data connection between the network operator and the power generator, for example the wind power installation and the windfarm, or the cluster controller, is disrupted, can be bridged. Only the case in which an unusually long time period of a disrupted data transmission network occurs results accordingly in the output of the predefined standard value as a controller setpoint in order to guarantee at least a defined state of the wind power installations or the windfarm in this case also.

According to a further embodiment, the predefined time period, the further predefined time period or the setpoint validity periods are selected in such a way that they correspond to a maximum of one minute, a maximum of two minutes or a maximum of five minutes. At least ten, at least twenty or at least fifty future setpoints are furthermore received with each data packet.

Even in the case of failure of the communication with the transmission system operator, a continuing control of the wind power installations or windfarm as far as possible meeting the demands of the transmission network is thereby guaranteed.

The invention furthermore relates to a system with a controller which is a controller of a power generator, for example a wind power installation or windfarm, or a cluster controller, and comprises the device according to one of the specified embodiments. The system preferably comprises a setpoint determination device which is, for example, a component of a control system of a transmission system operator, wherein the setpoint determination unit is configured to define current and future setpoints for at least one power generator, for example a windfarm or at least one wind power installation, or a cluster controller, and to generate data packets with current and future setpoints and transmit them via a data connection of the system to the controller.

BRIEF DESCRIPTION OF THE SEVERAL VIEWS OF THE DRAWINGS

Further embodiments can be found in the example embodiments explained in detail in the figures.

DETAILED DESCRIPTION

Figure 1:
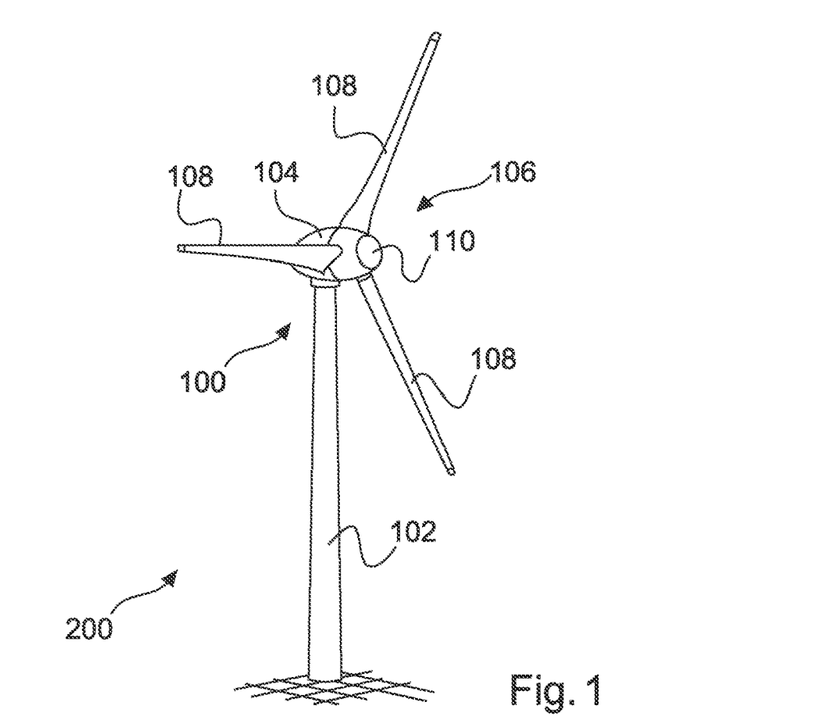
FIG. 1 shows a wind power installation.

FIG. 1 shows a schematic representation of a power generator 200, i.e., a wind power installation 100, according to the invention. The wind power installation 100 has a tower 102 and a nacelle 104 on the tower 102. An aerodynamic rotor 106 with three rotor blades 108 and a spinner 110 is provided on the nacelle 104. During the operation of the wind power installation 100, the aerodynamic rotor 106 is set in rotational motion by the wind and therefore also rotates a rotor 106 or winding of a generator which is directly or indirectly coupled to the aerodynamic rotor 106. The electrical generator is disposed in the nacelle 104 and generates electrical energy. The pitch angles of the rotor blades 108 can be modified by pitch motors on the rotor blade roots of the respective rotor blades 108.

Figure 2:
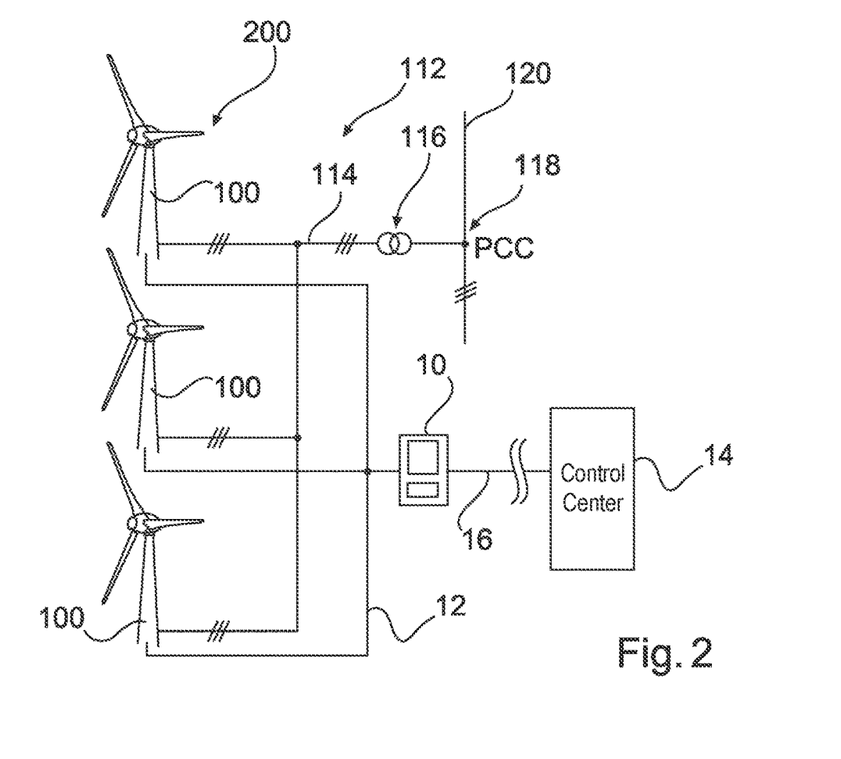
FIG. 2 shows a windfarm which is connected via a windfarm controller to a control center.

FIG. 2 shows a windfarm 112 with, by way of example, three wind power installations 100, which may be identical or different. The three wind power installations 100 thus represent essentially any number of wind power installations 100 of a windfarm 112. The wind power installations 100 provide their power, i.e., in particular, the generated current, via an electric windfarm grid 114. The currents or powers of the individual wind power installations 100 generated in each case are added together and a transformer 116 is usually provided to step up the voltage in the windfarm 112 and then feed it at the feed-in point 118, which is also generally referred to as a point of common coupling (PCC), into the supply grid 120. FIG. 2 is only a simplified representation of a windfarm 112, which, for example, shows no control unit of each individual wind power installation 100, although a control unit can obviously be present. The windfarm grid 114 may, for example, also be designed differently in that, for example, a transformer 116 is also present at the output of each wind power installation 100, to name but one different example embodiment.

FIG. 2 furthermore shows a controller 10, which is also referred to as a windfarm controller or SCADA computer and is connected via a bus system 12 to each individual wind power installation 100. FIG. 2 furthermore shows a control center 14 of a network operator, wherein the control center 14 and the controller 10 are interconnected via a connection 16. The connection 16 corresponds, for example, to a TCP/IP connection.

In FIG. 2, only a single windfarm 112 is connected by way of example to the control center 14. A plurality of windfarms 112 in each case with a plurality of wind power installations 100 and or power generators 200 are actually connected to the control center, but this is not shown here for the sake of clarity. FIG. 2 furthermore shows three wind power installations 100 which are connected to a controller 10 and thus, as a group of wind power installations 100, can similarly be regarded as a power generator 200. Along with the windfarm 112, individual wind power installations 100 are also conceivable, in each case having their own controller 10 which is in turn connected via a connection 16 to the control center 14. The connection 16 between the computer 10 and the control center 14 is shown here as relatively very short, but may actually be several tens or even several hundreds of kilometers long.

The connection 16 is furthermore shown as a direct connection between the controller 10 and the control center 14, wherein a multiplicity of further electronic components from the message transfer or data transfer domain are obviously interposed in a real transmission line. The connection 16 is shown here as a line, wherein this representation is also an example and a connection 16 may also comprise radio links.

The connection 16 between the control center 14 and the controller 10 of the windfarm serves to transmit setpoints, for example power setpoints, from the control center 14 to the windfarm controller 10. The controller 10 then controls, for example, the amount of electrical energy which is fed from the wind power installations 100 into the network 114 on the basis of these setpoints.

Figure 3:
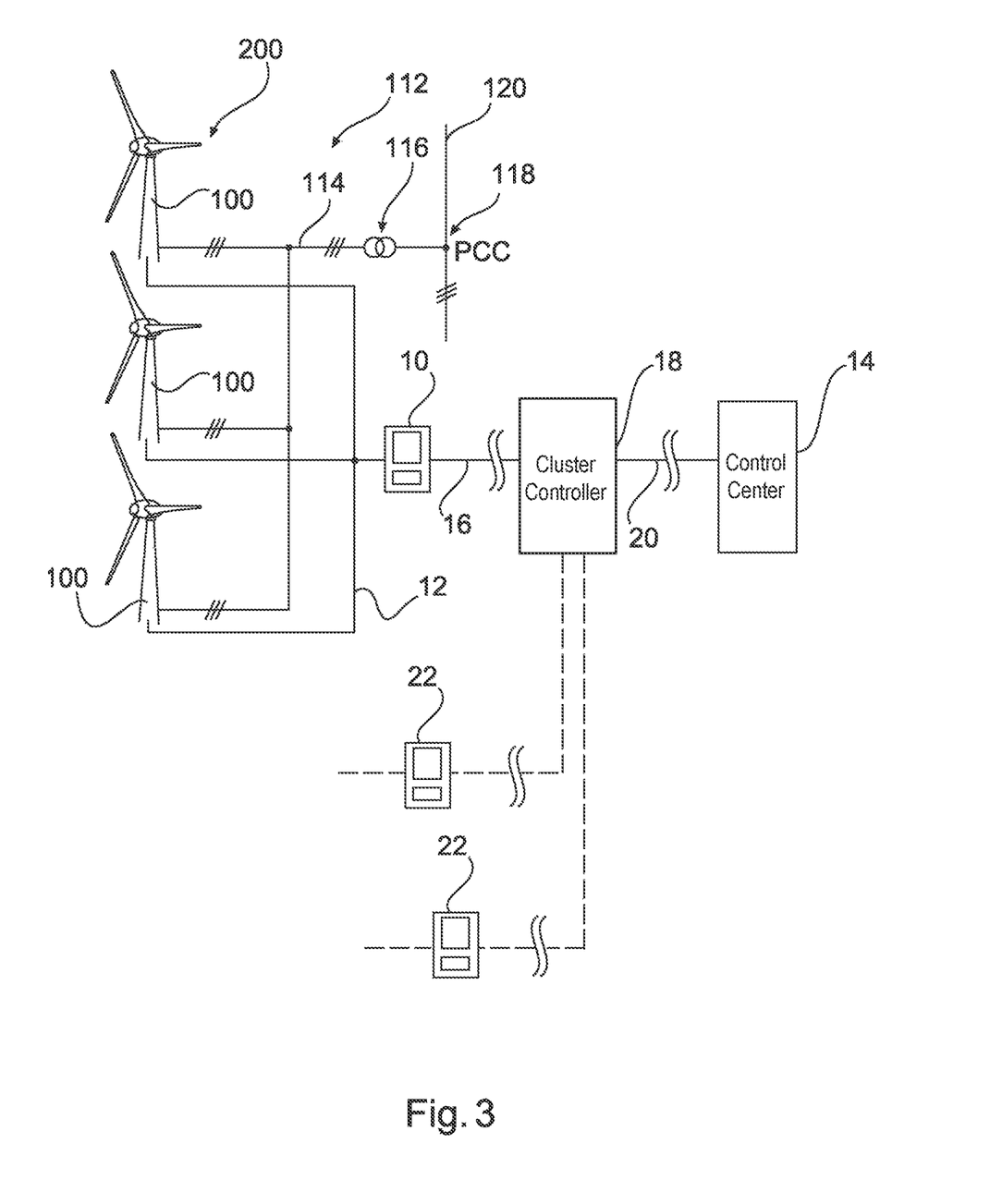
FIG. 3 shows a windfarm which is connected via a cluster controller and a windfarm controller to a control center.

FIG. 3, which essentially corresponds to FIG. 2, additionally shows a cluster controller 18 which is connected via a connection 20 to the control center 14. The cluster controller 18 is connected via the connection 16 to the windfarm controller 10. Further windfarm controllers 22 of further windfarms 112 or further power generators 200 are furthermore connected to the cluster controller 18. A setpoint, already mentioned in relation to FIG. 2, is then transmitted, for example for the power control, from the control center 14 of the supply network operator or transmission system operator to the cluster controller 18. The cluster controller 18 then forwards this setpoint to the controllers 10, 22, in each case adjusted for the corresponding windfarm controllers 10, 22 in order to supply a plurality of windfarms 112 or further power generators 200 with setpoints. The cluster controller 18 serves here, for example, to control all power generators 200 which feed in power in a subnetwork of the supply network 120 or of the transmission network, which is also referred to as a cluster. A cluster controller 18, for example, is connected here to the control center 14, wherein, according to other example embodiments, a plurality of cluster controllers 18 can be connected to the control center 14.

Figure 4:
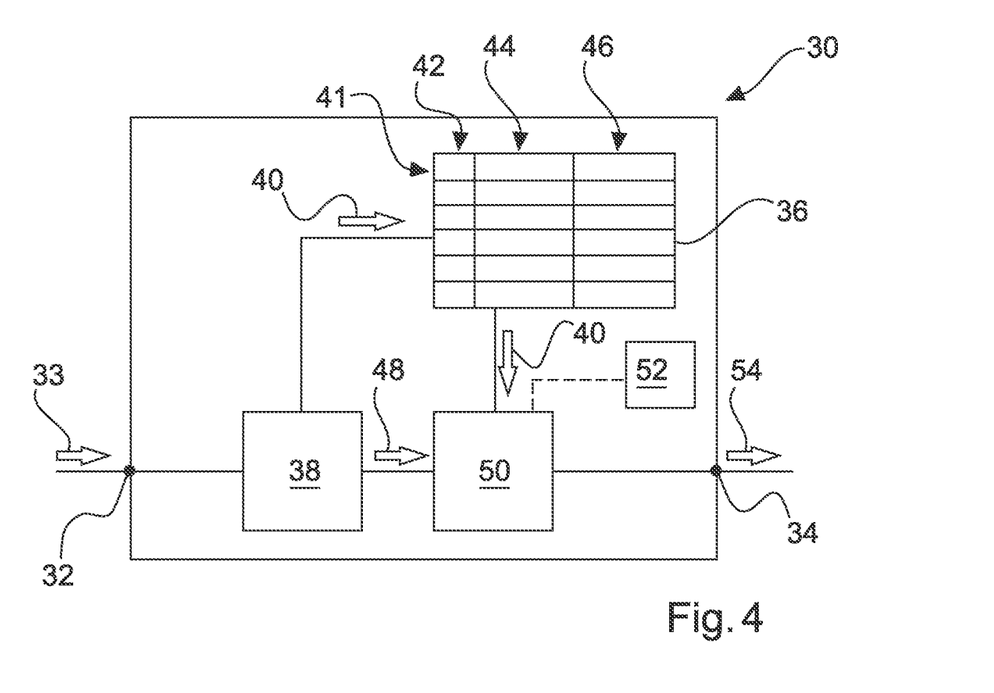
FIG. 4 shows an example embodiment of a device.

FIG. 4 shows an example embodiment of a device according to the invention as a component, for example, of the windfarm controller 10 or of a different power generator 200 according to one of the aforementioned embodiments, but also according to the cluster controller 18 according to a further embodiment.

The device 30 has a data input 32 and a data output 34. A memory 36 is furthermore provided. The data input 32 serves to receive data packets 33 with current and future setpoints. The data packet 33 which is received via the data input 32 is fed to a dividing unit 38, which can also be referred to as an extraction unit. The data packet 33 is divided in the dividing unit 38 into a plurality of future setpoints 40 and a current setpoint 48, i.e., a current setpoint 48 and a plurality of future setpoints 40 are extracted from the data packet 33. The current setpoints 48 are then transferred to a memory 36 and are stored, i.e., saved, there.

According to one particularly preferred example embodiment, the memory 36 stores the future setpoints 40 according to a table, wherein each row is allocated to a future setpoint 40. The memory 36 is therefore represented here as a type of table. The order of the respective future setpoint 40 of a row is stored in the left-hand column 42 of the memory 36. The setpoint itself is then stored in the adjacent second column 44 and a timestamp or a setpoint validity period for the setpoint is stored in the column 46.

The current setpoint 48 which has been extracted from a data packet 33 by the dividing unit 38 is applied directly to the decider 50. The decider 50 is connected to the data output 34 and decides which controller setpoint is output at the output 34. The decider 50 is controlled depending on a control unit 52 for this purpose.

To do this, the control unit 52 measures a time period and compares it with a predefined time period, for example a setpoint validity period. In detail, the time period from the arrival of the data packet 33 at the data input 32 is measured in the control unit 52. If a further data packet 33 is received at the data input 32 within a predefined time period, the decider 50 is prompted, through control of the decider 50 by the control unit 52, to output the current setpoint 48 of the further data packet 33 via the decider 50 at the data output 34. If no further data packet 33 is received via the data input 32 after the expiry of the predefined time period, a first future setpoint 40 is read from the memory 36 through control with the control unit 52 via the decider 50 and is output at the output 34 as the controller setpoint 54 for the control of a wind power installation 100 or a windfarm 112. In the case where the device 30 is a component of a windfarm controller 10, the controller setpoint 54, for example, is divided up into further controller setpoints for the individual wind power installations 100.

The control unit 52, the dividing unit 38, the memory 36 and the decider 50 are shown here as separate components for greater clarity and for better understanding. According to a further example embodiment (not shown), said components are implemented by a single processor of a microcontroller or a microcontroller itself.

Figure 5:
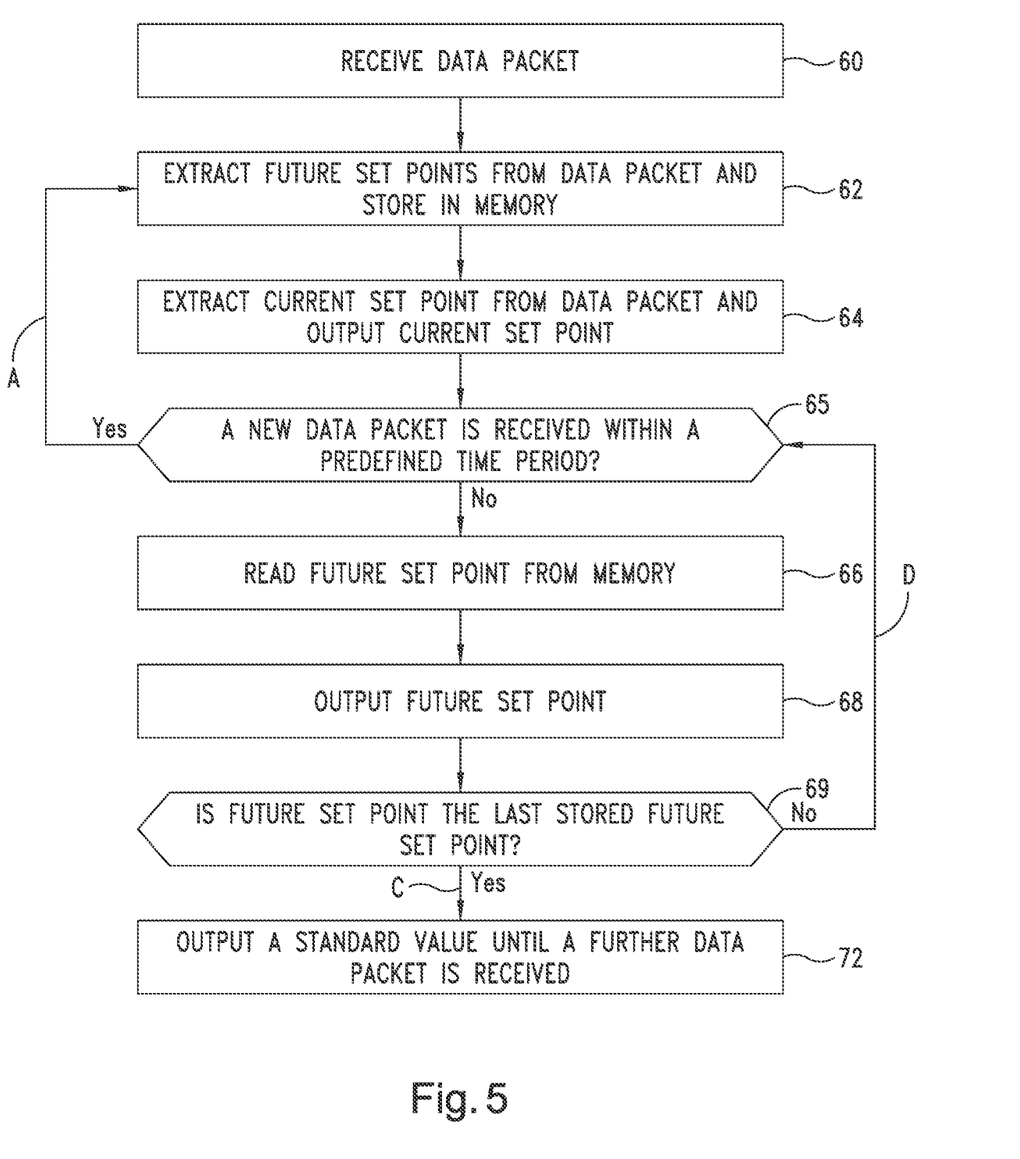
FIG. 5 shows a sequence of one example embodiment of a method.

The sequence of one example embodiment of the method is shown in FIG. 5. A data packet 33 is received in step 60 and future setpoints 40 extracted from the data packet 33 are stored in a memory 36 in step 62. The current setpoint 48 which has similarly been extracted from the data packet 33 is output at the data output 34 in step 64. A check is carried out in step 65 to determine whether a new data packet 33 has been received within a predefined time period.

In case A, where a new data packet 33 has been received within the predefined time, the method restarts in a loop at step 62. In case B, where no data packet 33 has been received within the predefined time period, a future setpoint 40 is read from the memory 36 in step 66 and this setpoint 40 is output at the output 34 in step 68. A check is then carried out in step 69 to determine whether the setpoint read from the memory is the last stored future setpoint 40. In case C, where further setpoints are no longer stored along with this output future setpoint 40, a standard value is output in step 72 until a further data packet 33 is received. In case D, where further future setpoints 40 are stored in the memory 36, in the case where no new data packet 33 has been received within the predefined time period, this being checked once more in step 65, a next future setpoint 40 is read from the memory 36 in step 66 and is output in step 68.

Per the method and the device 30, new adjusted controller setpoints 54 are thus always output, even if a data connection 16, 20 between a control center 14, a cluster controller 18, a controller of a power generator 200 and/or a windfarm controller 10 fails.

The invention claimed is:

1. A method for outputting a controller setpoint, comprising:
   receiving, via a data input, a data packet including a current setpoint and a plurality of future setpoints, the current setpoint and the plurality of future setpoints being for at least one power generator that is at least one wind power installation or windfarm, or at least one cluster controller;
   storing the plurality of future setpoints of the data packet in memory;
   outputting, via a data output, the current setpoint as the controller setpoint for the at least one power generator;
   determining that a further data packet was not received before an expiration of a predefined time period commencing from receiving the data packet; and
   on a condition that the further data packet was not received before the expiration of the predefined time period, outputting, over the data output, a first future setpoint of the stored plurality of future setpoints as a next controller setpoint.

2. The method as claimed in claim 1, comprising:
   receiving one or more further data packets each including a respective plurality of further future setpoints; and
   overwriting the plurality of future setpoints stored in the memory with the respective plurality of further future setpoints of the one or more further data packets after each reception of the one or more further data packets.

3. The method as claimed in claim 1, comprising:
   associating a respective setpoint validity period with each setpoint of the current setpoint and the plurality of future setpoints;
   determining that the predefined time period corresponding to the respective setpoint validity period of the current setpoint expired, the current setpoint being output as the controller setpoint after receiving the data packet; and
   determining that the further data packet was not received before expiration of the predefined time period corresponding to the respective setpoint validity period of the current setpoint, outputting, over the data output, the stored plurality of future setpoints as controller setpoints for respective time periods corresponding to the respective setpoint validity periods of the plurality of future setpoints.

4. The method as claimed in claim 1, comprising:
   associating a respective timestamp, of a plurality of timestamps, with each stored future setpoint of the stored plurality of future setpoints; and
   after expiry of the predefined time period during which the further data packet is not received, successively outputting one or more stored future setpoints, as the controller setpoint, at a time corresponding to the respective timestamp of the one or more stored future setpoints.

5. The method as claimed in claim 4, wherein the plurality of timestamps respectively associated with the stored plurality of future setpoints are different and a plurality of time intervals respectively associated with the plurality of timestamps are increasing or decreasing according to a temporal sequence of the successive outputting.

6. The method as claimed in claim 1, comprising:
assigning a sequence order corresponding to the stored plurality of future setpoints; and
after expiry of the predefined time period during which the further data packet is not received, outputting the first future setpoint of the stored plurality of future setpoints in accordance with the sequence order corresponding to the first future setpoint.

7. The method as claimed in claim 1, comprising:
successively outputting the stored plurality of future setpoints as controller setpoints; and
in response to successively outputting the stored plurality of future setpoints, outputting a predefined standard value as the controller setpoint.

8. The method as claimed in claim 1, wherein the predefined time period is at most one minute, two minutes or five minutes, and wherein a number of the plurality of future setpoints included in the data packet is at least ten, twenty or fifty future setpoints.

9. A device for outputting a controller setpoint for at least one power generator that is at least one wind power installation, at least one windfarm, or at least one cluster controller, comprising:
a data input configured to receive data packet including a current setpoint and a plurality of future setpoints;
a memory configured to store the plurality of future setpoints of the data packet;
a data output configured to output the current setpoint of the data packet as the controller setpoint for the at least one power generator that includes the at least one wind power installation, the at least one windfarm, or the at least one cluster controller; and
a controller configured to:
determine that a further data packet was not received before an expiration of a predefined time period commencing from receiving the data packet; and
on a condition that the further data packet was not received before the expiration of the predefined time period, cause a stored first future setpoint of the stored plurality of future setpoints to be output, over the data output, as a next controller setpoint.

10. The device as claimed in claim 9, wherein the controller is configured to:
overwrite the stored plurality of future setpoints stored in the memory with future setpoints included in the further data packet after each reception of the further data packet.

11. The device as claimed in claim 9, wherein a respective timestamp, of a plurality of timestamps, is associated with each stored future setpoints of the stored plurality of future setpoint or a respective setpoint validity period is associated with each setpoint of the current setpoint and the stored plurality of future setpoints, and wherein the controller is configured to output each stored future setpoint of the stored plurality of future setpoints as the controller setpoint for a time period corresponding to the respective timestamp of the stored future setpoint or corresponding to the respective setpoint validity period of the stored future setpoint.

12. The device as claimed in claim 11, wherein the plurality of timestamps are different from each other and a plurality of time intervals respectively associated with the plurality of timestamps are increasing or decreasing according to a temporal sequence according a temporal sequence of their respective outputting by the controller.

13. The device as claimed in claim 11, wherein a sequence order is allocated to the stored plurality of future setpoints and the controller is configured to, after the expiration of the predefined time period in which the further data packet was not received, cause the stored first future setpoint to be output in accordance with the sequence order corresponding to the stored first future setpoint.

14. The device as claimed in claim 9, wherein the device is arranged in a vicinity of a power generator controller of the at least one wind power installation, the at least one windfarm, or the at least one cluster controller.

15. A system, comprising:
the device as claimed in claim 9; and
a power generator controller that is the controller of the at least one wind power installation, the at least one windfarm, or the at least one cluster controller, wherein the device is integrated into the power generator controller.

16. The system as claimed in claim 15, comprising:
a control center configured to:
determine the current setpoint and the plurality of future setpoints,
generate the data packet including the current setpoint and the plurality of future setpoints, and
transmit the data packet, via a data connection, to the power generator controller.

* * * * *